(12) United States Patent
Kennedy

(10) Patent No.: US 8,837,896 B2
(45) Date of Patent: Sep. 16, 2014

(54) VISUAL EXTENDER FOR PORTABLE DEVICES

(75) Inventor: John T. Kennedy, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 1156 days.

(21) Appl. No.: 12/189,984

(22) Filed: Aug. 12, 2008

(65) Prior Publication Data

US 2010/0040326 A1    Feb. 18, 2010

(51) Int. Cl.
- *G02B 6/10* (2006.01)
- *G02B 6/08* (2006.01)
- *G02B 25/00* (2006.01)

(52) U.S. Cl.
CPC ............... *G02B 6/08* (2013.01); *G02B 25/002* (2013.01)
USPC ........................................................ 385/146

(58) Field of Classification Search
USPC ........................................................ 385/146
See application file for complete search history.

(56) References Cited

U.S. PATENT DOCUMENTS

| | | | |
|---|---|---|---|
| 4,299,447 A | 11/1981 | Soltan et al. | |
| 5,150,445 A * | 9/1992 | Toyoda et al. | 385/116 |
| 6,628,867 B1 * | 9/2003 | Solntsev | 385/116 |
| 6,795,256 B2 | 9/2004 | Wang | |
| 7,277,239 B2 * | 10/2007 | Carnevali | 359/802 |
| 2005/0185114 A1 * | 8/2005 | Cok | 349/73 |

FOREIGN PATENT DOCUMENTS

WO    2006133110 A2    12/2006

OTHER PUBLICATIONS

"Richards Vending & Supply: Phone Magnifier," retrieved Aug. 6, 2008, http://www.richardsvending.com/store/item/yyos/Sample_Products/phone_magnifier.html?i . . . , 3 pages.

* cited by examiner

*Primary Examiner* — Uyen Chau N Le
*Assistant Examiner* — Hoang Tran
(74) *Attorney, Agent, or Firm* — Seed IP Law Group PLLC

(57) ABSTRACT

A portable electronic system comprises a portable electronic device having a screen and a visual extender. The visual extender has a thin film element and is coupled to the portable electronic device, positioning the thin film element to provide visual extension of the screen of the portable electronic device.

37 Claims, 13 Drawing Sheets

VISUAL EXTENDER FOR PORTABLE DEVICES

BACKGROUND

1. Technical Field

This description generally relates to the field of portable electronic devices, and more particularly to extending images from portable electronic devices.

2. Description of the Related Art

For many years, the trend in portable electronic devices has been towards miniaturization. Cellular phones, handheld computers and music players have become increasingly small and lightweight, and even multi-function portable devices are now pocket-sized and smaller.

Unfortunately, this miniaturization comes at a cost. As portable electronic devices get smaller and smaller, the eyesight of their users has not correspondingly improved, and it has become difficult for many to read the screens of these devices. Moreover, as the screens of these portable devices improve, portable device manufacturers often take advantage of the improved pixel density to fit more onto the screen, shrinking font and image sizes. Thus, consumer demand for miniaturization and increased utility has resulted in many devices with tiny, nearly unreadable screens.

There is, therefore, a need for improved systems and devices for viewing images generated by portable electronic devices.

BRIEF SUMMARY

In one embodiment, a portable electronic system is disclosed. The portable electronic system comprises: a portable electronic device having a screen; and a visual extender having a thin film light duplication and extension element, the visual extender coupled to the portable electronic device, positioning the thin film element to provide visual extension of an image generated on the screen of the portable electronic device.

In another embodiment, a visual extender for extending an image generated on a screen of a portable electronic device is disclosed. The visual extender comprises: a thin film element defining a screen side and a second side opposite the screen side, and a coupling element configured to couple the visual extender to a portable electronic device with the screen side of the thin film element facing a screen of the portable electronic device.

In still another embodiment, a method of enlarging an image generated by a screen of a portable electronic device is disclosed, the method comprising: displaying an image on a screen of a portable electronic device; coupling a visual extender to the portable electronic device, the visual extender having a screen side and a second side opposite the screen side; positioning the visual extender with the screen side facing the screen of the portable electronic device; and displaying at least a portion of the image as an enlarged portion on the second side of the visual extender.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, or the like. In other instances, well-known structures associated with thin film technology, waveguides, integrated circuits, and portable electronic devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract provided herein are for convenience only and do not interpret the scope or meaning of the embodiments.

Description of an Exemplary Portable Electronic System

Figure 1:
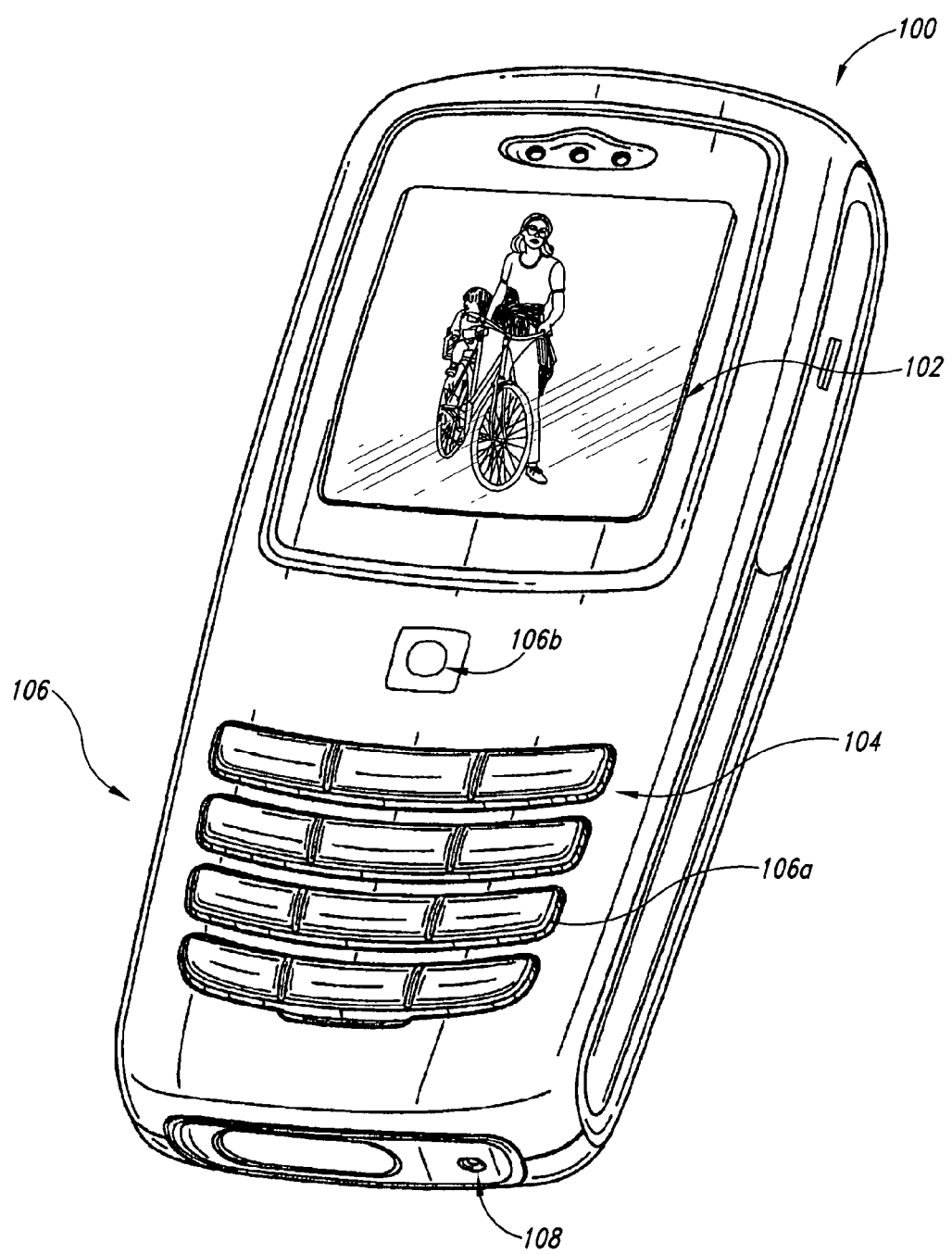
FIG. 1 is a perspective view of a portable electronic device, namely a cellular phone, with which one embodiment of the present invention may be used.

FIG. 1 is a schematic view of an example portable electronic device 100. As illustrated, the portable electronic device 100 comprises a cellular telephone. However, it may be understood that any portable electronic device having a screen may be used in conjunction with the visual extenders described herein. For example, handheld computers, digital cameras, portable music players, remote controls, personal video players, laptop computers, GPS devices, electronic gaming devices, electronic books, and other portable electronic devices may also be used.

In one embodiment, the portable electronic device 100 comprises a screen 102 and a user interface 104. As illustrated, the screen 102 comprises the viewable portion of a liquid crystal display ("LCD"). However, any of a variety of displays may be used in order to display text and/or images to a user of the portable electronic device 100. For example, cathode ray tube displays, digital light processing displays, field emission displays, light-emitting diode displays, liquid crystal on silicon displays, organic light-emitting diode displays, plasma display panels, surface-conduction electron-emitter displays, vacuum fluorescent displays, and other electronic display technologies may be used to create the text/images on the screen 102.

In one embodiment, the user interface 104 comprises a separate component or group of components of the portable electronic device 100 dedicated to receiving user input. In the illustrated embodiment, the user interface 104 comprises a keypad 106, including buttons 106a and a trackball 106b. Of course, other structures may also be used for receiving user input. In still other embodiments, the portable electronic device 100 may lack a separate user interface and may instead enable the screen 102 to provide user interface functionality. For example, the screen 102 may comprise a touch screen that accepts and responds to user input. In still other embodiments, other user interfaces (e.g., a speech recognition interface) may be used.

As shown in FIG. 1, an image is displayed on the screen 102 of the portable electronic device 100. This image may have any of a variety of sources. For example, the image may comprise a photograph that was sent to the portable electronic device 100 wirelessly or may be an image generated by a camera that forms part of the portable electronic device 100. In another embodiment, the image represents a frame of a video playing on the portable electronic device 100. In still other embodiments, the screen 102 of the portable electronic device 100 may primarily or solely display text, graphics, icons or other characters.

In the illustrated embodiment, the portable electronic device 100 further includes an external power port 108. This power port 108 may enable a power storage element (not shown) of the portable electronic device 100 to be charged. Moreover, in some embodiments, this external power port 108 is coupled to external devices in order to deliver power to such external devices from the power storage element of the portable electronic device 100. In other embodiments, different power ports may be used to accomplish these charging and power delivery tasks.

Figure 2:
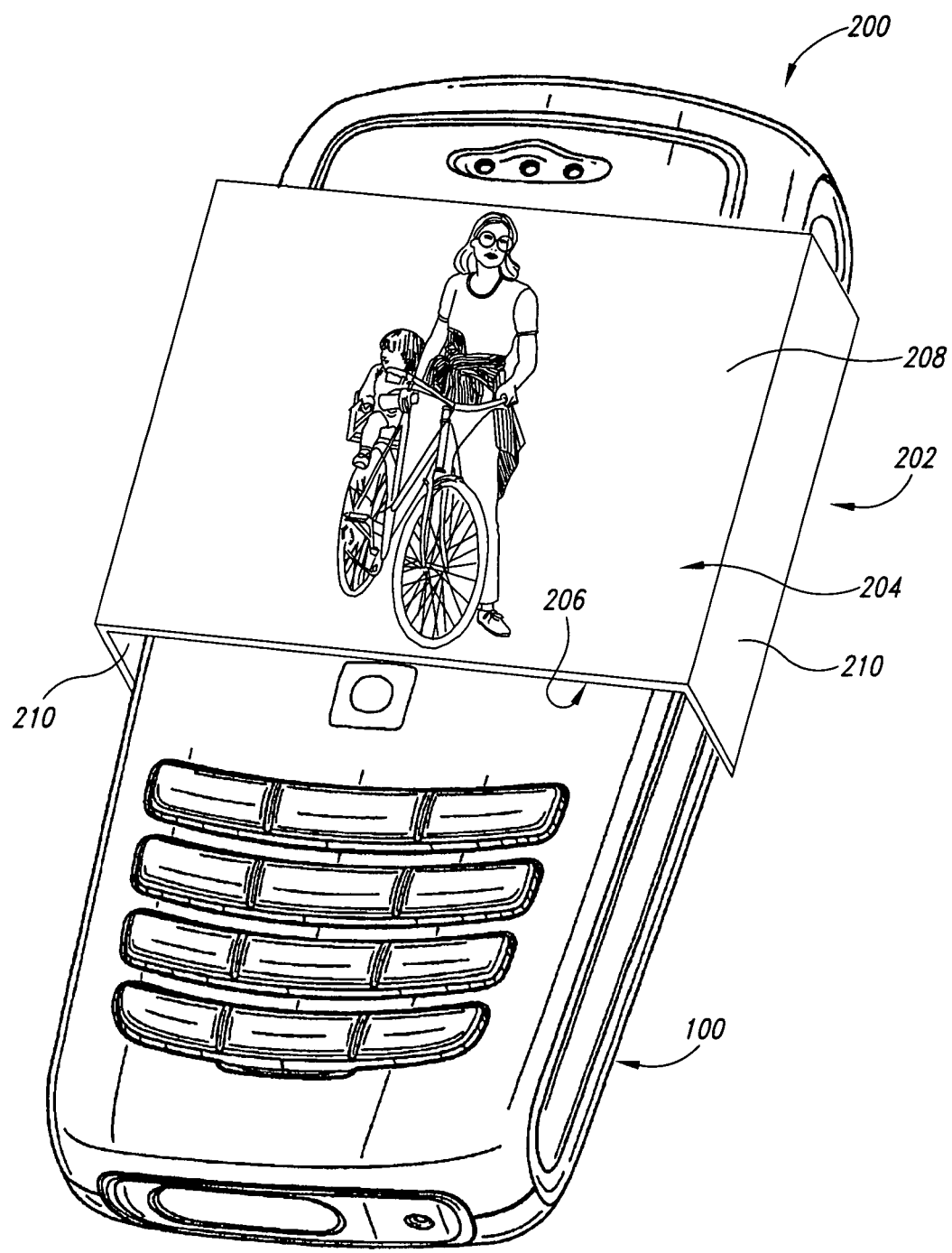
FIG. 2 is a perspective view of a portable electronic system including the portable electronic device of FIG. 1 and a visual extender, according to one illustrated embodiment.
Figure 3:
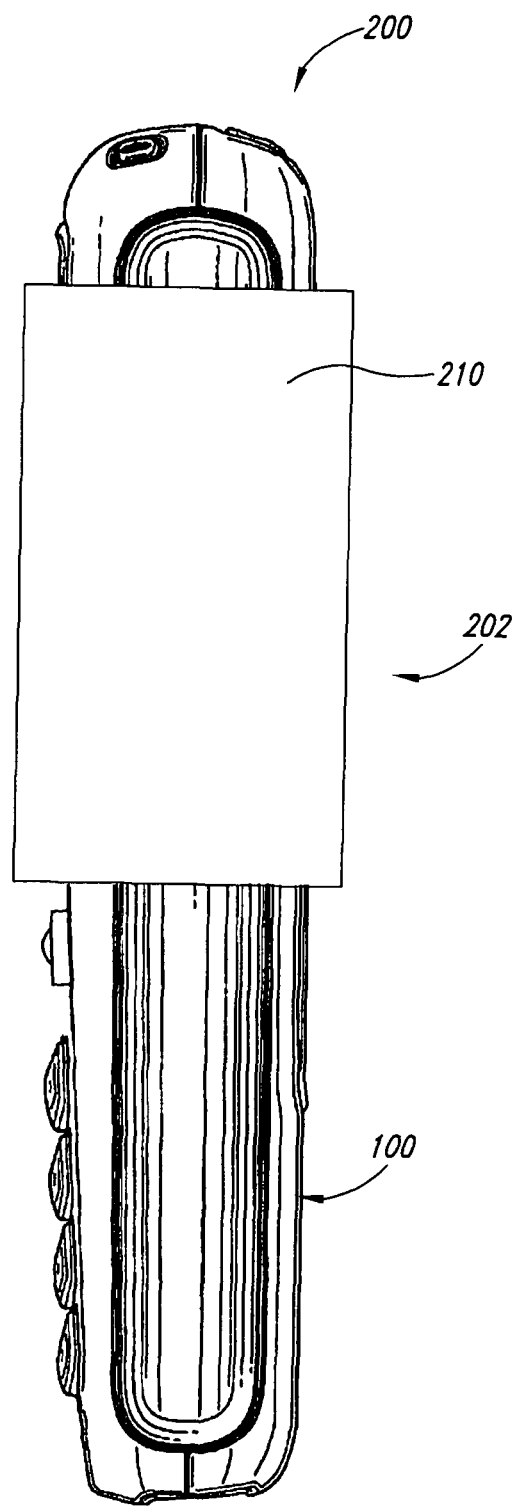
FIG. 3 is a side view of the portable electronic system of FIG. 2, according to one illustrated embodiment.

FIG. 2 shows an exemplary portable electronic system 200, including the portable electronic device 100 of FIG. 1 and a visual extender 202 coupled to the portable electronic device 100. FIG. 3 illustrates a side view of the same portable electronic system 200.

In one embodiment, the visual extender 202 comprises a thin film element 204. The thin film element 204 may be configured to visually enhance, enlarge, broaden, multiply or otherwise extend at least a portion of the image or other information displayed on the screen 102 of the portable electronic device 100. Thus, in one embodiment, the visual extender 202 allows a user of the portable electronic device 100 to more easily view or read the information presented via the screen 102 by coupling the visual extender 202 thereto. In different embodiments, varying degrees of extension may be implemented. For example, the thin film element 204 may extend the images displayed on the screen 102 by 120-150%. In other embodiments, using larger visual extenders, even greater extension of the information presented via the screen may be achieved.

The visual extender 202 may be coupled to the portable electronic device 100 such that the thin film element 204 is positioned to provide visual extension of the screen 102 of the portable electronic device 100. In some embodiments, the thin film element 204 is positioned to be substantially concentric with the screen 102 of the portable electronic device 100. However, in other embodiments, the thin film element 204 is positioned to cover substantially the entire screen 102 of the portable electronic device 100, even if it is not concentric with the screen 102.

The visual extender 202 may be positioned such that the thin film element 204 is more or less proximate the screen 102. In one embodiment, the thin film element 204 contacts the screen 102 along at least some part of a surface area of the thin film element 204. However, in other embodiments, a gap is left between the screen 102 and the thin film element 204.

The thin film element 204 may comprise any of a variety of thin films enabling the visual extension or magnification of images. The thin film element 204 may have a screen side 206 facing the screen 102 configured to receive light emerging from the screen 102, and a second side 208 opposite the screen side 206 configured to display an extended image to a user of the portable electronic system 200. Different methods for fabricating the thin film element 204 may be employed to realize this functionality, such as physical vapor deposition ("PVD"), chemical vapor deposition ("CVD"), plasma enhanced chemical vapor deposition ("PECVD"), or other thin film fabrication methodologies. In one embodiment, the thin film element 204 comprises a plurality of waveguides defined between the screen side 206 and the second side 208. These waveguides may be tapered such that they expand from the screen side 206 to the second side 208. In other embodiments, the waveguides may split or multiply, such that more waveguides are used to display the extended image at the second side 208.

The thin film element 204 may have any of a variety of thicknesses defining the distance between the screen side 206 and the second side 208. These thicknesses may depend at least in part on the thin film technology used to form the thin film element 204, as well as on the degree of visual extension provided. In one embodiment, the thin film element 204 is thinner than 5 mm. In another embodiment, the thin film element 204 is thinner than 1 mm. In still other embodiments, the thin film element 204 is thinner than 10 μm. Of course, various coatings and additional layers may be added above or below the thin film element 204, which may, in turn, affect the total thickness of the visual extender 202.

The thin film element 204 may comprise any of a variety of materials in order to yield the desired optical characteristics. In one embodiment, the thin film element 204 comprises a silicon substrate, which may be processed to create silicon waveguides suitable for passing visible light from the screen side 206 to the second side 208. In other embodiments, other materials used in thin film technologies, such as germanium, may be used. In another embodiment, a plurality of carbon nano-tubes having visual light reflective inner surfaces may be used to pass light from the screen side 206 to one or more areas located on the second side 208.

As illustrated, in one embodiment, the visual extender 202 is coupled to the portable electronic device 100 such that the thin film element 204 does not overlay the user interface 104. Thus, a user may simultaneously view a visually extended image presented on the second side 208 of the thin film element 204 while interacting normally with the portable electronic device 100. Of course, in other embodiments, the visual extender 202 may overlay at least a portion of the user interface 104. For example, when used with a personal video player, the visual extender may be left in place for long periods without user interaction, and the visual extender may therefore extend over and at least partially cover the user interface of the personal video player.

In one embodiment, the visual extender 202 further includes one or more baffles 210 configured to substantially prevent light from external sources from entering the space between the screen 102 and the screen side 206 of the thin film element 204. In one embodiment, the baffles 210 may thus help to prevent glare and other undesirable light transmission through the visual extender 202.

Figure 4:
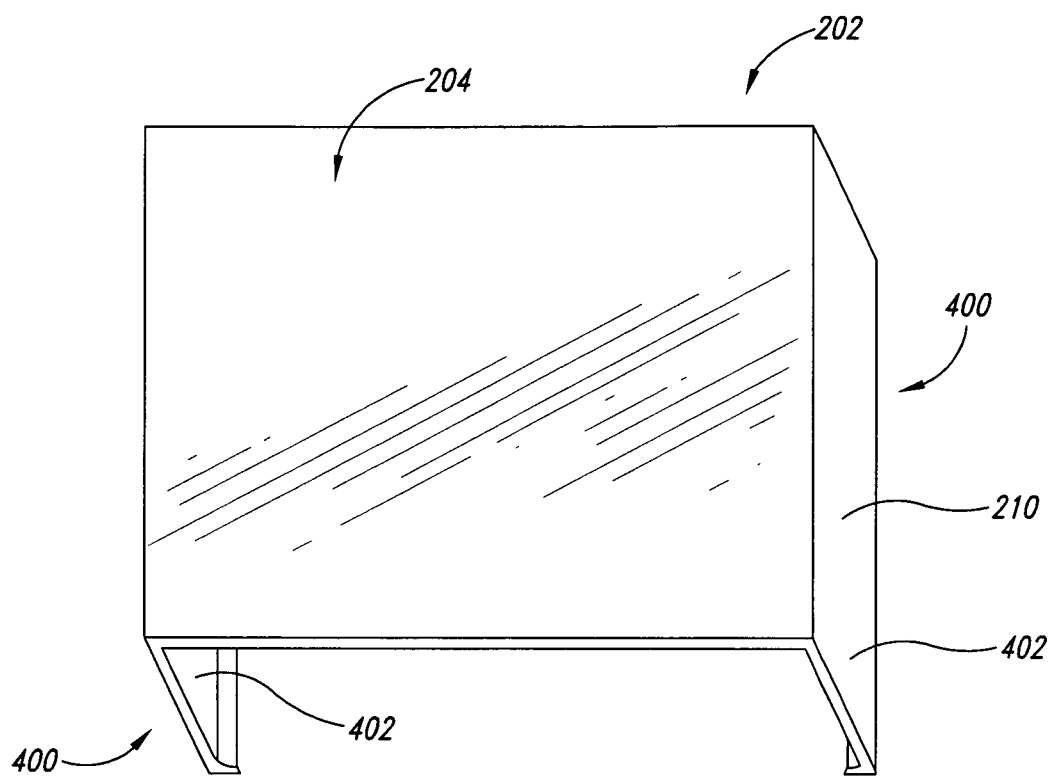
FIG. 4 is a front, perspective view of the visual extender of FIG. 2, according to one illustrated embodiment.
Figure 5:
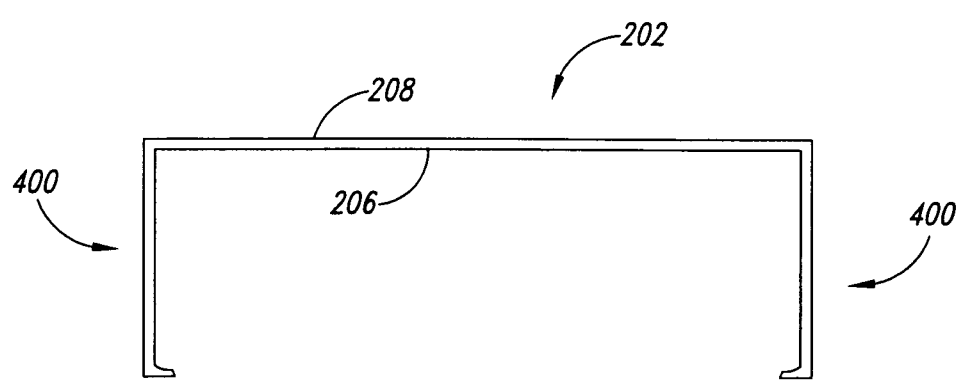
FIG. 5 is a top view of the visual extender of FIG. 2, according to one illustrated embodiment.

FIGS. 4 and 5 illustrate the visual extender 202 in a detached configuration. As illustrated therein, the visual extender 202 may include one or more coupling elements 400 configured to couple the visual extender 202 to a portable electronic device, such as portable electronic device 100, with the screen side 206 of the thin film element 204 facing a screen of the portable electronic device.

In one embodiment, the coupling elements 400 comprise two clips 402 configured to removably couple the visual extender 202 to the portable electronic device 100. As illustrated, the clips 402 may wrap around at least a portion of a body of the portable electronic device 100 and frictionally couple the visual extender 202 thereto. In other embodiments, the coupling elements 400 engage corresponding surface features of the portable electronic device 100, such as tabs or indentations. The coupling elements 400 may also enable correct registration and positioning of the visual extender 202 relative to the portable electronic device 100. For example, the clips 402 may interact with surface features of the portable electronic device 100 to ensure correct positioning of the thin film element 204. In other embodiments, different coupling elements 400 configured to couple the visual extender 202 to the portable electronic device 100 may be used.

Description of Another Exemplary Visual Extender

Figure 6:
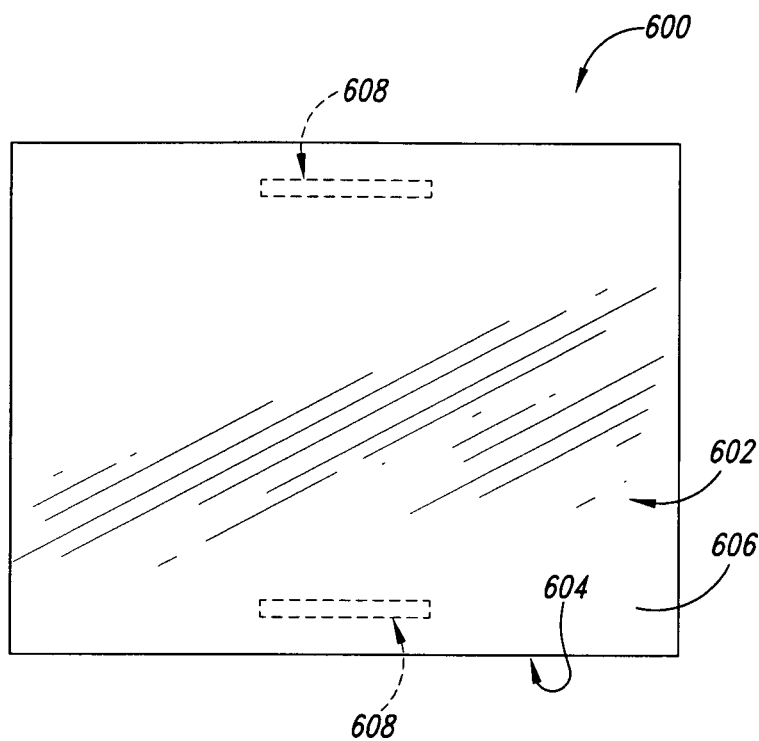
FIG. 6 is a front, schematic view of another visual extender, according to one illustrated embodiment.
Figure 7:
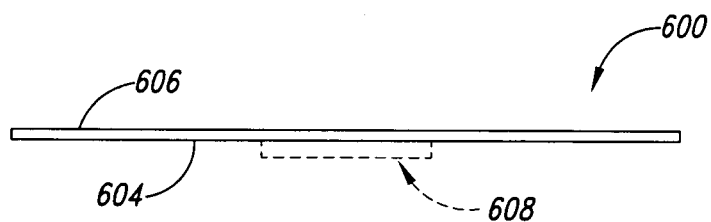
FIG. 7 is a side view of the visual extender of FIG. 6, according to one illustrated embodiment.
Figure 8:
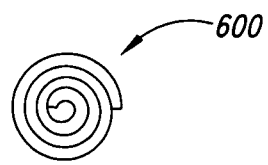
FIG. 8 is a side view of the visual extender of FIG. 6 in a rolled configuration, according to one illustrated embodiment.

FIGS. 6-8 illustrate another exemplary visual extender 600. FIGS. 6 and 7 show front and bottom views, respectively, of the visual extender 600 in a flattened configuration, while FIG. 8 shows the visual extender 600 in a rolled configuration.

In one embodiment, the visual extender 600 includes a thin film element 602 configured similarly to the thin film element 204 discussed at length above. This thin film element 602 has a screen side 604 (not visible in FIG. 6) and a second side 606 opposite the screen side 604.

In one embodiment, the visual extender 600 comprises solely the thin film element 602. However, in other embodiments, the visual extender 600 further includes one or more coupling elements 608. These coupling elements 608 may comprise hook and loop type fasteners located at the top and bottom of the screen side 604 of the visual extender 600. These hook and loop type fasteners may engage corresponding hook and loop type fastening material on a portable electronic device or on a case carrying a portable electronic device. In another embodiment, the coupling elements 608 comprise a tacky material for removable coupling the visual extender 600 to a portable electronic device.

In one embodiment (as illustrated by FIG. 8), the visual extender 600 is flexible, and may be rolled up for easy storage and carrying. For example, in one embodiment, the visual extender 600 is configured to be stored within a body of a portable electronic device. In such an embodiment, the portable electronic device may have a compartment within which the visual extender 600 is rolled up. The visual extender 600 may then be removed from the compartment and placed in front of a screen of the portable electronic device for improved viewing. Rails, guides or similar structures may be provide on or applied to the portable electronic device to facilitate the positioning of the visual extender when extended from its rolled, storage state.

Description of a Case and Another Exemplary Visual Extender

Figure 9:
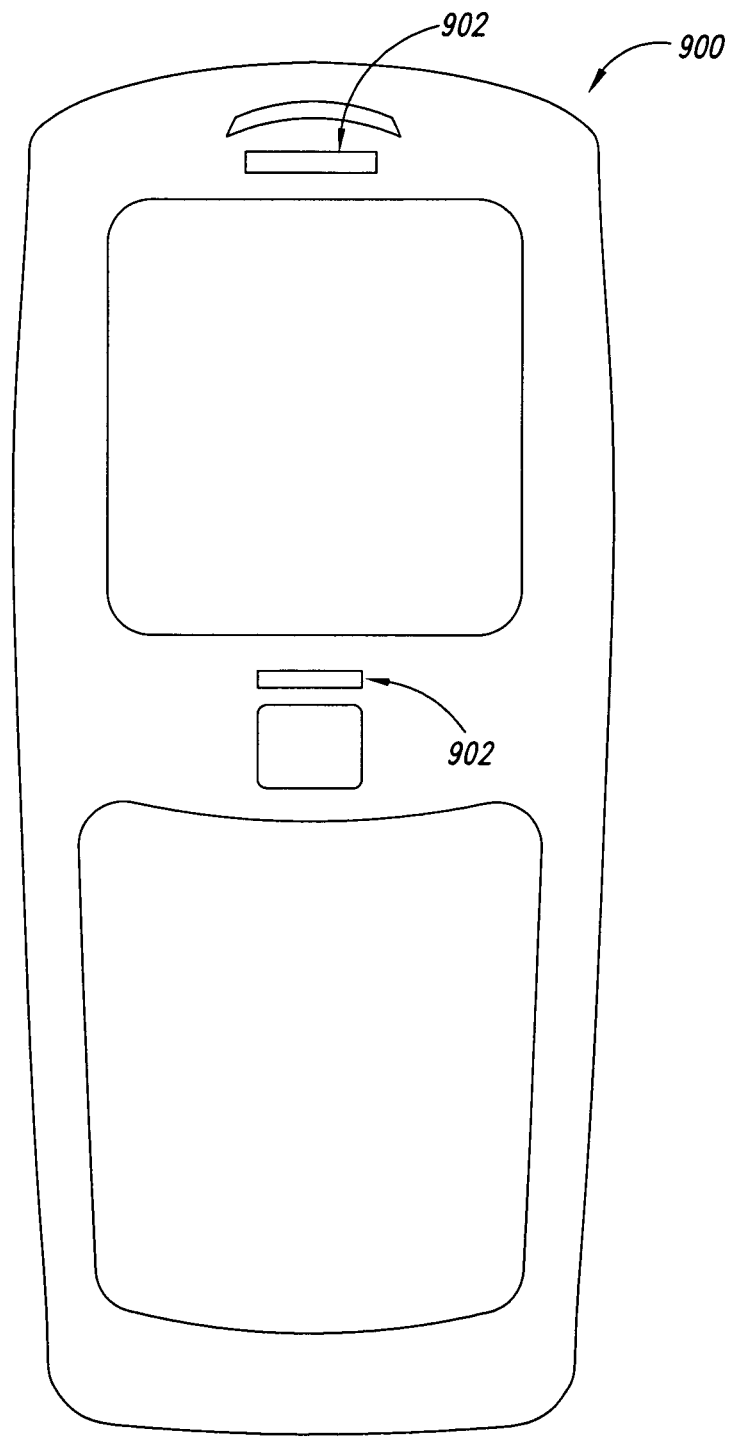
FIG. 9 is a front schematic view of a case for a cellular phone configured to be coupled to a visual extender, according to one illustrated embodiment.
Figure 10:
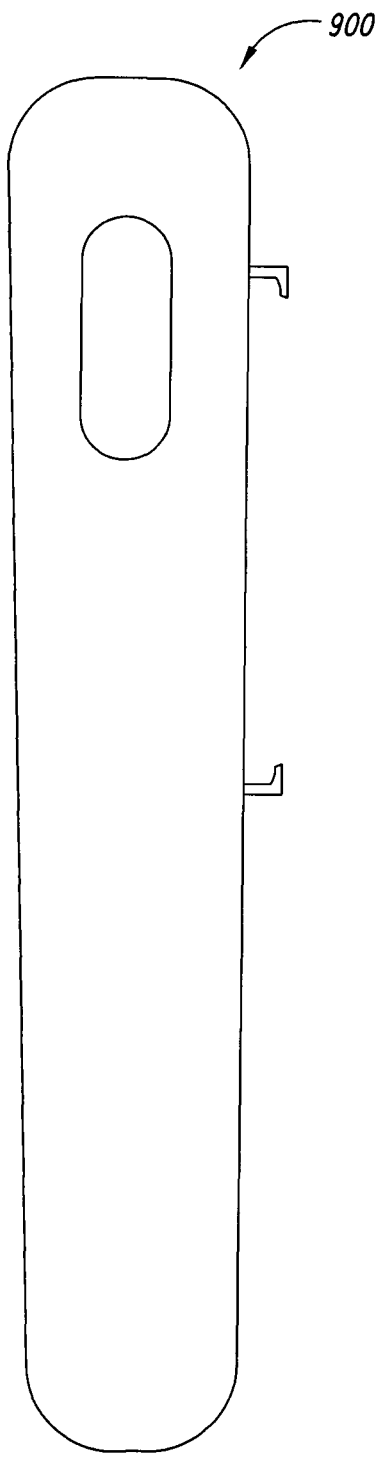
FIG. 10 is a side schematic view of the case of FIG. 9, according to one illustrated embodiment.
Figure 11:
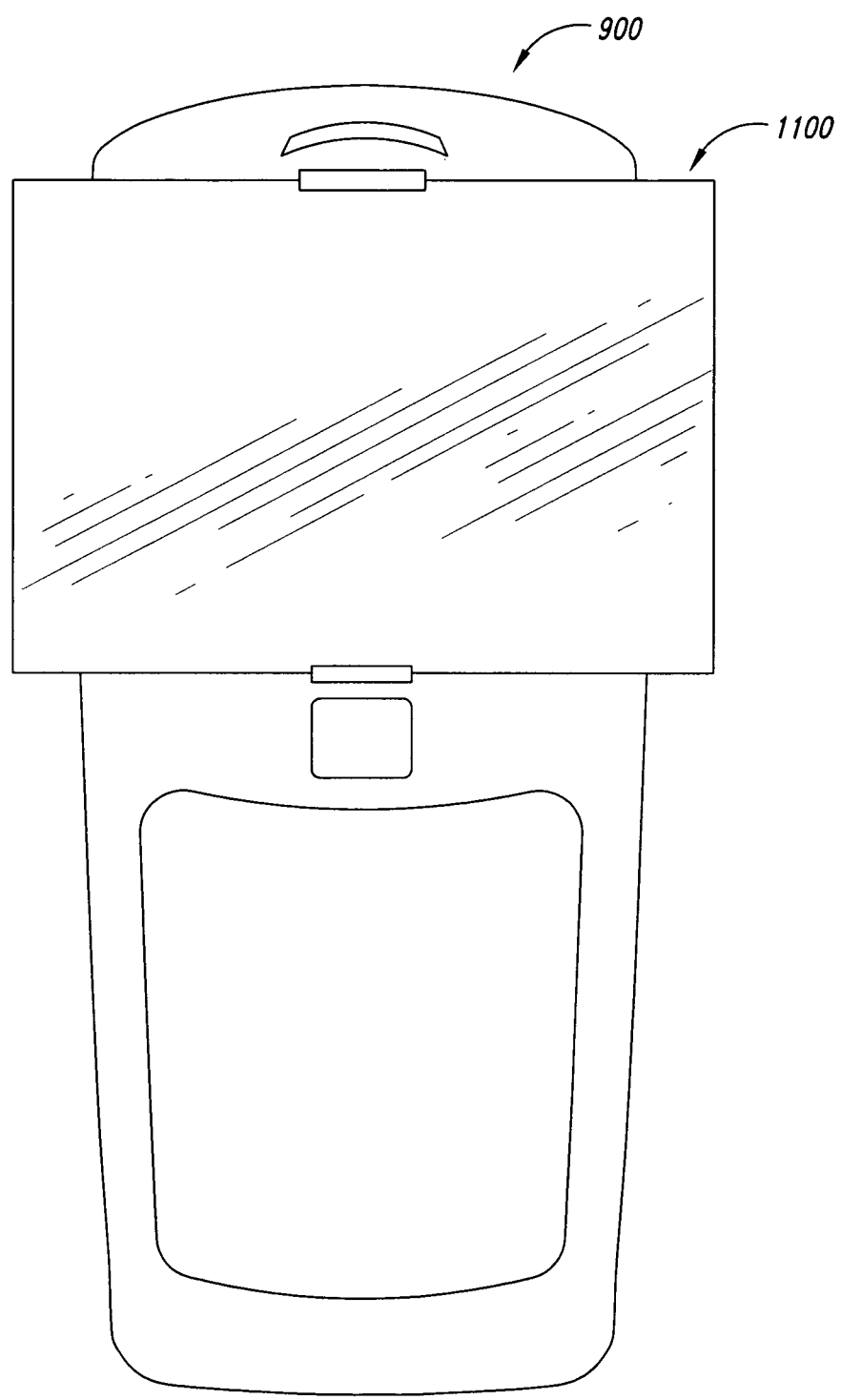
FIG. 11 is a front schematic view of the case of FIG. 9 coupled to a visual extender, according to one illustrated embodiment.

FIG. 9 shows a case 900 configured to receive a portable electronic device, such as a cellular phone. FIG. 10 is a side view of the case 900, and FIG. 11 shows a visual extender 1100 coupled to the case 900. As illustrated, the case 900 may be coupled to the portable electronic device 100, described at length above. However, in different embodiments, the case 900 may be coupled to any of a variety of portable electronic devices.

The case 900 may comprise any of a variety of cases configured to receive portable electronic devices and may be made from a variety of different materials. In one embodiment, the case 900 comprises a substantially flexible material designed to fit snugly around the portable electronic device 100. In other embodiments, the case 900 may be relatively rigid.

As illustrated, the case 900 includes one or more clips 902 for retaining the visual extender 1100. When a user wishes to position the visual extender 1100 adjacent a screen of a portable electronic device, she may slide the visual extender 1100 between the clips 902. Of course, in other embodiments, other structures may be used to couple the visual extender 1100 to the case 900. For example, in some embodiments, the visual extender 1100 and the case 900 each include corresponding structures for engaging and positioning the two components. In other embodiments, the visual extender may be built into the case for permanent use whenever the portable electronic device is secured by the case.

Description of Another Case and Another Exemplary Visual Extender

Figure 12:
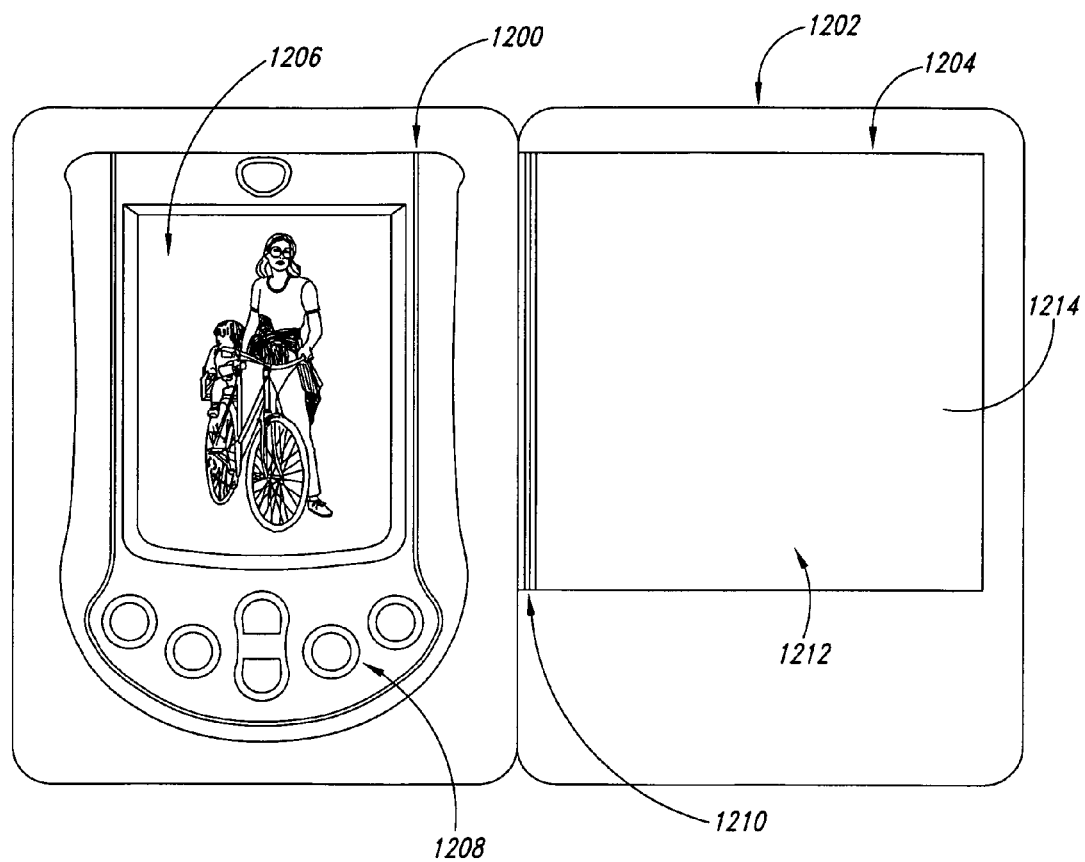
FIG. 12 is a front schematic view of another portable electronic device, namely a handheld computer, positioned within a case carrying a visual extender, according to one illustrated embodiment.
Figure 13:
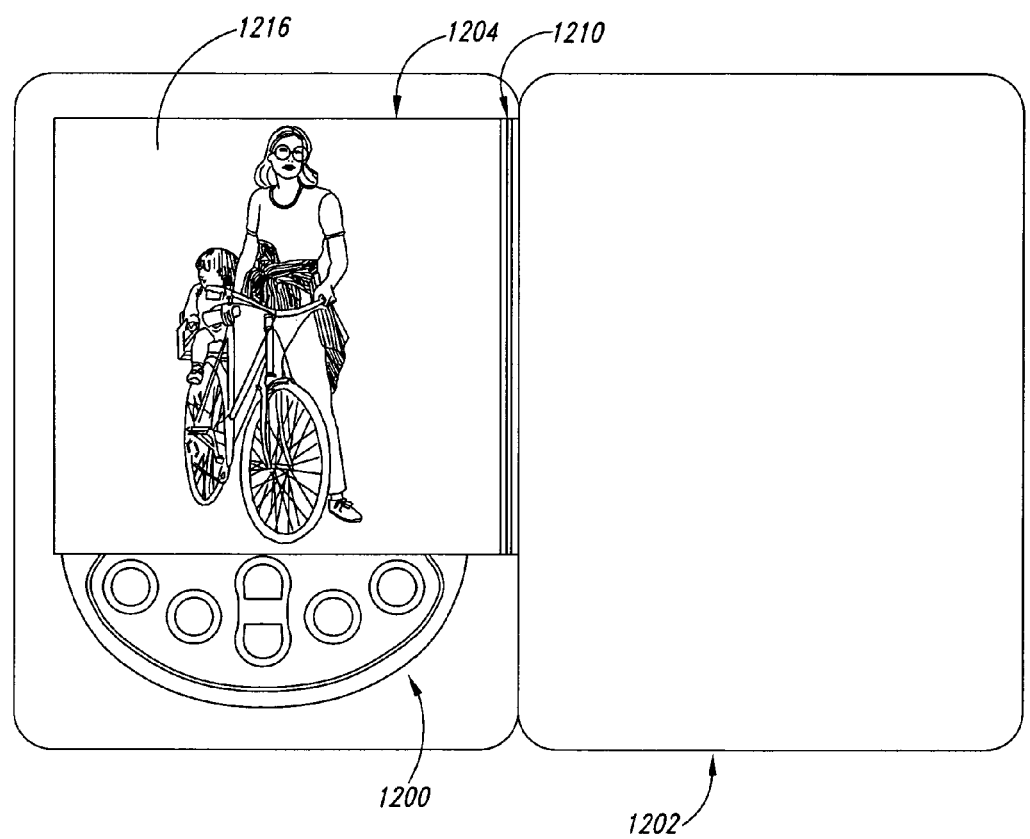
FIG. 13 is a front schematic view of the portable electronic device of FIG. 12 with the visual extender positioned over a screen of the portable electronic device, according to one illustrated embodiment.

FIG. 12 shows another portable electronic device 1200 positioned within a case 1202 coupled to a visual extender 1204. As illustrated in FIG. 12, the visual extender 1204 is positioned on an opposite side of the case 1202 from the portable electronic device 1200. FIG. 13 shows the visual extender 1204 in position over a screen 1206 of the portable electronic device 1200.

As illustrated, the portable electronic device 1200 comprises a handheld computer. For example, the portable electronic device 1200 may comprise a PALM-based handheld device or a Microsoft Windows-based handheld device. In one embodiment, the portable electronic device 1200 comprises a screen 1206 and a separate user interface 1208. However, in some embodiments, the portable electronic device 1200 may also be configured to accept user input via interactions with the screen 1206 itself.

The case 1202 may comprise any of a variety of cases configured to receive the portable electronic device 1200. As with the case 900, the case 1202 may comprise a variety of different materials and may be more or less rigid.

In one embodiment, the visual extender 1204 is coupled to the case 1202. As illustrated, the visual extender 1204 includes a coupling element 1210 configured to couple the visual extender 1204 to the case 1202. This coupling element 1210 may comprise a hinge-type connection, allowing the visual extender 1204 to be positioned over and swung away from the screen 1206.

In one embodiment, the visual extender 1204 comprises a thin film element 1212 configured to visually extend at least a portion of the image displayed on the screen 1206. The thin film element 1212 may have a screen side 1214 (shown on FIG. 12) configured to face the screen 1206, and a second side 1216 (shown on FIG. 13) opposite the screen side 1214. The thin film element 1212 may comprise any of a variety of thin films enabling the visual extension of images.

Description of an Exemplary Thin Film Element

Figure 14:
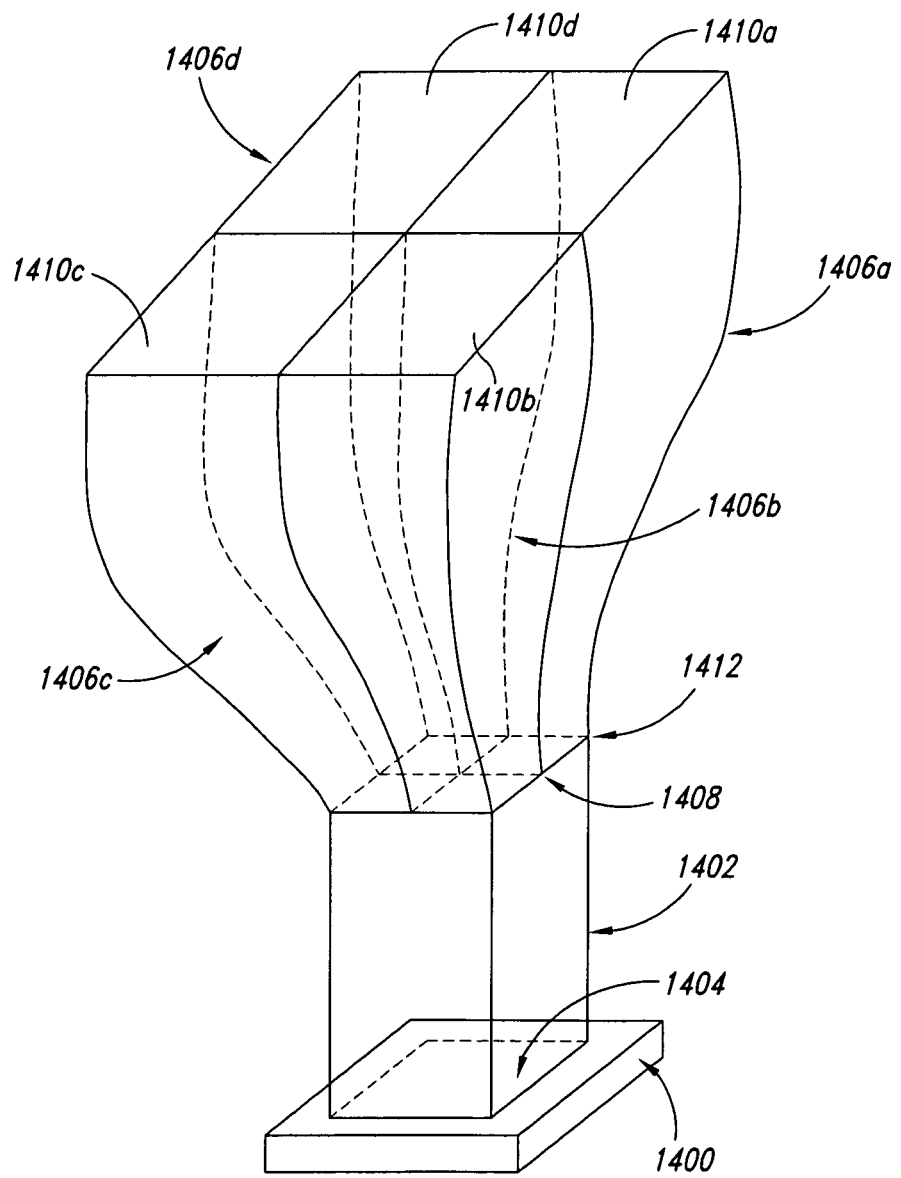
FIG. 14 is a schematic illustration of a portion of a thin film visual extension element proximate a pixel, according to one illustrated embodiment.

FIG. 14 is a simplified, schematic illustration of a portion of a thin film element proximate a pixel 1400, representing a pixel of a screen of a portable electronic device. The structures illustrated in FIG. 14 may be formed using any of a variety of thin film techniques. It may be understood that the Figure merely shows a conceptual illustration of an example thin film element, and that corresponding structures of an actual thin film element may not resemble the Figure except with respect to the functions performed by the corresponding structures.

As illustrated in FIG. 14, a first waveguide 1402 has an entrance 1404 proximate the pixel 1400. Four other waveguides 1406*a, b, c, d* (collectively 1406) have entrances (illustrated by dashed lines) proximate an exit 1408 of the first waveguide 1402. During operation, these waveguides 1406 may divide the light from the pixel 1400 transmitted through the first waveguide 1402 such that the light is displayed over a larger effective surface area at respective exits 1410*a, b, c, d* (collectively 1410) of the four waveguides 1406. Thus, the light generated by pixel 1400 is effectively visually extended by this waveguide configuration.

In one embodiment, the first waveguide 1402 (incorporated into a thin film element) has an entrance 1404 proximate a screen side of the thin film element. Thus, when the thin film element is coupled to a portable electronic device, the entrance 1404 of the first waveguide 1402 may be brought proximate one or more pixels of a screen of the portable electronic device. Although illustrated in perfect alignment with the pixel 1400, it is not necessary that the entrance 1404 be perfectly aligned with the pixel 1400 for effective visual extension of the light generated by the pixel 1400. In some embodiments, the entrance 1404 accepts light emerging from a plurality of pixels of a proximate screen.

In one embodiment, the entrance 1404 has dimensions that are smaller than or equal to dimensions of the pixel 1400. For example, as illustrated, the entrance 1404 may have dimensions that are smaller than the dimensions of the pixel 1400. In other embodiments, the entrance 1404 may have larger dimensions than those of the pixel 1400.

In one embodiment, at least two other waveguides 1406*a, b* (also incorporated into a thin film element) have corresponding exits 1410*a, b* proximate a visually extended, second side of the thin film element. Thus, when the thin film element is coupled to a portable electronic device, the exits 1410*a, b* may face a user of the portable electronic device. Further, by bending or otherwise shaping the waveguides, it is to be appreciated that the relative angle of the second side to the user may vary from the relative angle of the screen side to the user. That is, the image presented by the visual extender may appear tilted or angled from its original presentation as provided by the screen of the portable electronic device. As illustrated, additional waveguides 1406*c, d* may also be included in the thin film element, and may also have corresponding exits 1410*c, d* proximate the visually extended side of the thin film element.

In one embodiment, the exits 1410 each have substantially similar dimensions to those of the entrance 1404. However, in other embodiments, the exits 1410 may be smaller or larger than the entrance 1404, which may result in more or less visual extension.

In one embodiment, as illustrated, a cross-section of the waveguides 1406 expands from the exit 1408 of the first waveguide 1402 towards the respective exits 1410 of the waveguides 1406, such that the exits 1410 have substantially similar dimensions to those of the first entrance 1404. These tapering waveguides 1406 may thus comprise the structures in the thin film element that yield the effective visual extension. In other embodiments, a cross-section of the first waveguide 1402 may also expand from its entrance 1404 to its exit 1408.

In one embodiment, a splitter 1412 is included in the thin film element. The splitter 1412 may be configured to split light passing through the first waveguide 1402 among at least two waveguides 1406*a, b*. In some embodiments, the splitter 1412 is further configured to split light passing through the first waveguide 1402 among additional waveguides 1406*c, d*. In still other embodiments, the splitter 1412 is configured to split the light passing through the first waveguide 1402 among any number of waveguides. Indeed, the splitter 1412 may have any of a variety of configurations for splitting light passing through a first plurality of waveguides among a second plurality of waveguides.

The splitter 1412 may comprise physical dividing elements (e.g., optically opaque walls) and additional active elements configured to divide light incident to the splitter 1412. In one embodiment, the splitter 1412 comprises the effective walls of the waveguides 1406, which function to divide the light passing through the first waveguide 1402.

In the illustrated embodiment, the pixel 1400 appears as four magnified "pixels" (i.e., the exits 1410) at a second side of the thin film element. If the exits 1410 were to have the same dimensions as the pixel 1400, then the image presented on the second side of the visual extender will appear to a viewer as being four times larger than the size of the original image, as presented on the screen of the portable electronic device. In different embodiments, each pixel 1400 may correspond to a different number of visually extended "pixels"/ exits 1410 on the second side of the thin film element. In addition, each pixel 1400 may also be larger than or smaller than each of the exits 1410. Thus, any effective visual extension may be achieved with more or fewer exits of varying dimensions.

In one embodiment, the thin film element further includes an optical amplifier (not shown) at least partially positioned between the first entrance 1404 of the first waveguide 1402 and the exit 1410*a* of the waveguide 1406*a*. Without the optical amplifier, the second side of the thin film element may appear dimmer than a screen of the portable electronic device, as the light emerging from each pixel 1400 is divided among multiple exits 1410. The optical amplifier may therefore be configured to amplify light passing between the first entrance 1404 and the exit 1410*a*. In other embodiments, one or more optical amplifiers may be at least partially positioned between the first entrance 1404 and each of the exits 1410*a, b, c, d*, thus amplifying the light that passes through all of the exits 1410. The optical amplifier may comprise any of a plurality of amplifiers capable of amplifying the light as it passes through the thin film element. One or more optical amplifier(s) may be additionally or alternatively positioned on the screen side of the visual extender, on the second side of the visual extender, or in combinations thereof.

In one embodiment, the optical amplifier comprises an active element requiring a source of electrical power. Therefore, the optical amplifier may be coupled to draw power from a power storage element (e.g., a battery) of the portable electronic device. For example, the visual extender may include one or more electrical connectors coupled to the portable electronic device to draw power therefrom. In other embodiments, the visual extender includes its own power storage element for delivering power to the optical amplifier. In other embodiments, the visual extender may include or be connected to one or more power generation elements, such as solar cells and associated electronics or the like.

In another embodiment, the portable electronic device may be configured to include a high power mode, for use with the visual extender, whereupon activation of the high power mode, the portable electronic device outputs more lumens per pixel than are otherwise output in a reduced or normal lower power mode.

Description of Another Exemplary Thin Film Element

Figure 15:
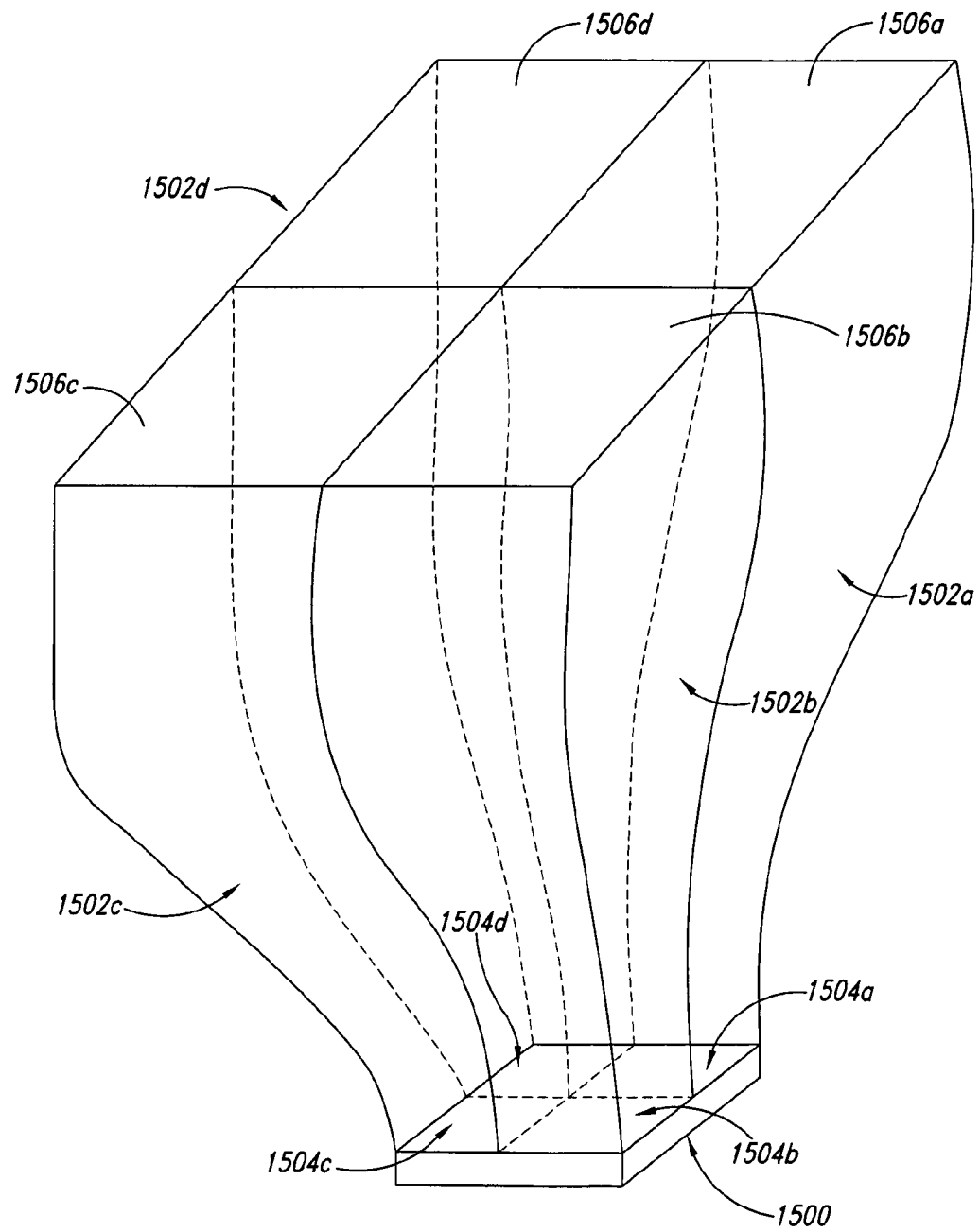
FIG. 15 is a schematic illustration of a portion of another thin film visual extension element proximate a pixel, according to one illustrated embodiment.

FIG. 15 is a simplified, schematic illustration of a portion of another exemplary thin film element proximate a pixel 1500, representing a pixel of a screen of a portable electronic device. The structures illustrated in FIG. 15 may be formed using any of a variety of thin film or carbon nano-tube formation techniques. It may be understood that the Figure merely shows a conceptual illustration of an example thin film element, and that corresponding structures of an actual thin film element may not resemble the Figure except with respect to the functions performed by the corresponding structures.

In one embodiment, a first tapered waveguide 1502*a* (incorporated into a thin film element) expands from a first entrance 1504*a* proximate a screen side of the thin film element towards a first exit 1506*a* proximate a second side of the thin film element. Similarly, a second tapered waveguide 1502*b* expands from a second entrance 1504*b* proximate the screen side towards a second exit 1506*b* proximate the second side. Thus, when the thin film element is coupled to a portable electronic device, the entrances 1504*a, b* may be brought proximate one or more pixels of a screen of the portable electronic device. Although illustrated in perfect alignment with the pixel 1500, it is not necessary that the entrances 1504*a, b* be perfectly aligned with the pixel 1500 for effective magnification. In some embodiments, the entrances 1504*a, b* accept light emerging from a plurality of pixels of a proximate screen.

In one embodiment, the combined dimensions of the entrances 1504*a, b* are smaller than or equal to dimensions of the pixel 1500. For example, as illustrated, the combined entrances 1504*a, b* have dimensions that are smaller than the dimensions of the pixel 1500, while the combined entrances 1504*a, b, c, d* have dimensions that are equal to the dimensions of the pixel 1500. In other embodiments, the entrances 1504 may each have dimensions that are larger than or equal to those of the pixel 1500. Further, the entrances 1504 may each have dimensions that correspond to two or more pixels or portions of two or more pixels.

In one embodiment, the exits 1506*a, b* each have substantially similar dimensions to those of the pixel 1500. Of course, in other embodiments, the exits 1506*a, b* may be smaller or larger than the pixel 1500, which may result in more or less visual extension.

As illustrated, additional tapered waveguides 1502*c, d* may also be included in the thin film element, and may be configured similarly to the waveguides 1502*a, b* described herein.

In one embodiment, the thin film element further includes an optical amplifier (not shown) at least partially positioned between the first entrance 1504*a* and the first exit 1506*a* of the first tapered waveguide 1502*a*. The optical amplifier may be configured to amplify light passing through the first tapered waveguide 1502*a*. In other embodiments, one or more optical amplifiers may be at least partially positioned between each of the entrances 1504*a, b, c, d* and the corresponding exits 1506*a, b, c, d*, thus amplifying the light that passes through each of the tapered waveguides 1502*a, b, c, d*. One or more optical amplifier(s) may be additionally or alternatively positioned on the screen side of the visual extender, on the second side of the visual extender, or in combinations thereof.

In one embodiment, the optical amplifier comprises an active element requiring a source of electrical power. The optical amplifier may be coupled to draw power from a power storage element (e.g., a battery) of the portable electronic device. For example, the visual extender may include one or more electrical connectors coupled to the portable electronic device to draw power therefrom. In other embodiments, the visual extender includes its own power storage element for delivering power to the optical amplifier. In other embodiments, the visual extender may include or be connected to one or more power generation elements, such as solar cells and associated electronics or the like.

As shown in FIG. 14, the total effective light from the pixel 1400 travels through the first waveguide 1402 and is then divided between the four waveguides 1406. Thus, each of the visually extended "pixels"/exits 1410 may reflect the properties of the entire pixel 1400. In contrast, as shown in FIG. 15, each of the four waveguides 1502 may receive light from only a corresponding quadrant of the pixel 1500. Thus, each of the visually extended "pixels"/exits 1506 in FIG. 15 may reflect only the properties of that quadrant of the pixel 1500. Thus, in one embodiment, if a pixel has properties that vary across its surface, FIGS. 14 and 15 may yield visually extended "pixels" at the second side of a thin film element with very different properties.

In at least one embodiment, the second side of the thin film element may include adaptive optics (not shown) that reside proximally above the second side and diffuse or enhance, as necessary, the light emitting from any given pixel (e.g., 1506*a*) or group of pixels (e.g., 1506*a-d*) such that a uniform lumen density is achieved and presented across the second side of the thin film element.

While FIGS. 14 and 15 show exemplary thin film structures that may be used to visually extend images, alternative thin film structures may also be used to form the thin film element. In addition, the number of waveguides and resulting visually extended "pixels" at the second side of the thin film element may also be varied. For example, in one embodiment, there may be a 1:1 ratio between pixels on the screen of the portable electronic device and pixels at the second side of the thin film element. In another embodiment, there may be a non-whole number ratio (e.g., 1:1.5) between pixels on the screen of the portable electronic device and pixels at the second side of the thin film element. In still another embodiment, as illustrated in FIGS. 14 and 15, there may be a 1:4 ratio between pixels on the screen of the portable electronic device and pixels at the second side of the thin film element. In different embodiments, the sizes of the "pixels" on the second side of the thin film element and the ratio of visually extended "pixels" to screen pixels of the portable electronic device may be varied to achieve a desired visual extension effect. Indeed, in other embodiments, a number of different waveguide configurations may be used to visually extend an image between a screen side and a second side of the thin film element. It is to be appreciated that the second side of the thin film element may or may not be coplanar with the screen side of the thin film element.

Figure 16:
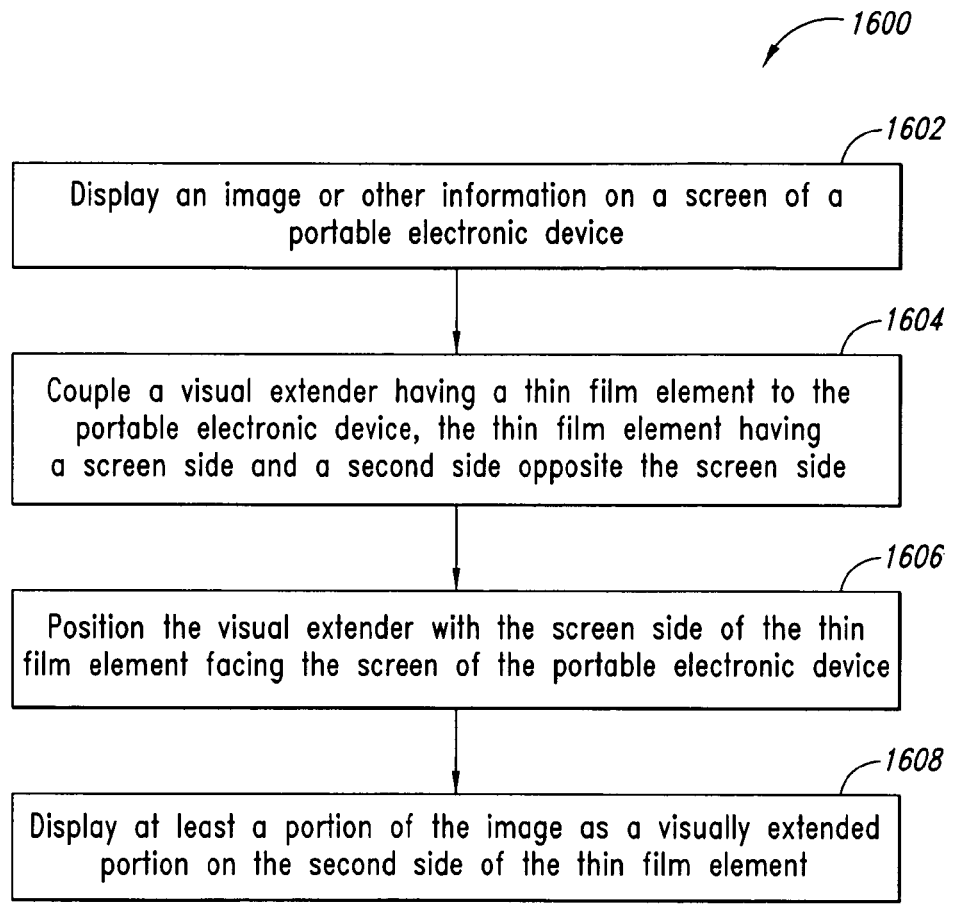
FIG. 16 shows a flow diagram for a method of visually extending the information presented via a screen of a portable electronic device, according to one illustrated embodiment.

Description of an Exemplary Method for Visually Extending Information Presented via a Screen FIG. 16 illustrates a flow diagram for a method 1600 of visually extending the information presented via a screen of a portable electronic device, according to one embodiment. This method 1600 will be discussed in the context of the portable electronic system 200 of FIG. 2. However, it may be understood that the acts disclosed herein may be executed using a variety of visual extenders coupled to different portable electronic devices.

The method begins at 1602, when an image or other information is displayed on a screen 102 of the portable electronic device 100. The image or information may come from a variety of different sources. In one embodiment, the image is displayed on the screen 102 in response to user input requesting that images stored on the portable electronic device 100 be displayed. In another embodiment, the image is displayed as a frame of a video playing on the portable electronic device 100. In still another embodiment, the image is displayed without user input based on a program executed within the portable electronic device 100.

At 1604, a visual extender 202 having a thin film element 204 is coupled to the portable electronic device 100, the thin film element 204 having a screen side 206 and a second side 208 opposite the screen side 206. A user may couple the visual extender 202 to the portable electronic device 100 using any of a variety of structures. In one embodiment, the visual extender 202 is clipped to the portable electronic device 100 (e.g., using one or more clips 402). In another embodiment, hook and loop fasteners or other coupling elements are used, as illustrated in FIGS. 6 and 7. In yet another embodiment, the visual extender is coupled to the portable electronic device by coupling a case (e.g., the case 900) carrying the visual extender to the portable electronic device.

In one embodiment, the visual extender 202 is also coupled to a power storage element of the portable electronic device 100. For example, an electrical connector (not shown) of the visual extender may be coupled to a power port 108 of the portable electronic device 100. Thus, in one embodiment, active elements within the visual extender 202 (e.g., one or more optical amplifiers) receive power from the portable electronic device 100.

At 1606, the visual extender 202 is positioned with the screen side 206 of the thin film element 204 facing the screen 102 of the portable electronic device 100. As described at length above, the visual extender 202 may be coupled to the portable electronic device 100 to position the thin film element 204 to provide visual extension of the image or information presented of the screen 102. In some embodiments, the screen side 206 is substantially concentric with the screen 102. However, in other embodiments, other portions of the screen side 206 may overlap the screen 102.

As illustrated in FIG. 2, in one embodiment, the visual extender 202 is positioned such that the thin film element 204 does not overlay a user interface 104 of the portable electronic device 100. Thus, a user may simultaneously view a visually extended image on the second side 208 of the thin film element 204 while interacting normally with the portable electronic device 100.

At 1608, at least a portion of the image is displayed as a visually extended portion on the second side 208 of the thin film element 204. This visual extension may be achieved using any of a variety of thin film or carbon nano-tube formation techniques used to form the thin film element 204. Moreover, varying degrees of visual extension may be implemented in different visual extenders. Thus, in one embodiment, the visual extender 202 allows a user of the portable electronic device 100 to more easily view or read an image on the screen 102 by coupling the visual extender 202 to the portable electronic device 100.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A portable electronic system, comprising:
a portable electronic device having a screen; and
a visual extender having a substantially planar thin film element, the visual extender coupled to the portable electronic device such that the substantially planar thin film element lies upon or over the screen and provides visual extension of the screen of the portable electronic device to enlarge images generated thereby, the substantially planar thin film element including:
   a screen side facing the screen;
   a second side opposite the screen side, a distance between the screen side and the second side defining a thickness of the substantially planar thin film element;
   a first waveguide having a first entrance proximate the screen side and a first exit positioned between the screen side and the second side;
   a second waveguide having a second entrance proximate the first exit of the first waveguide and a second exit proximate the second side of the substantially planar thin film element, a cross-section of the second waveguide expanding from the second entrance towards the second exit;
   a third waveguide having a third entrance proximate the first exit of the first waveguide and a third exit proximate the second side of the substantially planar thin film element, a cross-section of the third waveguide expanding from the third entrance towards the third exit; and
   a splitter located between the first waveguide and the second and third waveguides which is configured to split light emanating from the screen of the portable electronic device and passing through the first waveguide among at least the second waveguide and the third waveguide.

2. The portable electronic system of claim 1, wherein the portable electronic device further includes a user interface and the visual extender is coupled to the portable electronic device to overlay locations of the portable electronic device other than the user interface.

3. A portable electronic system, comprising:
a portable electronic device having a screen; and
a visual extender having a thin film element, the visual extender coupled to the portable electronic device to position the thin film element so as to provide visual extension of the screen to enlarge images generated thereby, the thin film element including:
a screen side facing the screen;
a second side opposite the screen side, a distance between the screen side and the second side defining a thickness of the thin film element;
a first waveguide having a first entrance proximate the screen side and a first exit positioned between the screen side and the second side;
a second waveguide having a second entrance proximate the first exit of the first waveguide and a second exit proximate the second side of the thin film element, a cross-section of the second waveguide expanding from the second entrance towards the second exit;
a third waveguide having a third entrance proximate the first exit of the first waveguide and a third exit proximate the second side of the thin film element, a cross-section of the third waveguide expanding from the third entrance towards the third exit; and
a splitter located between the first waveguide and the second and third waveguides which is configured to split light emanating from the screen of the portable electronic device and passing through the first waveguide among at least the second waveguide and the third waveguide.

4. The portable electronic system of claim 3, wherein the first entrance of the first waveguide has dimensions that are smaller than or equal to dimensions of a pixel of the screen of the portable electronic device.

5. The portable electronic system of claim 4, wherein the second exit and the third exit each have substantially similar dimensions to the first entrance.

6. The portable electronic system of claim 3, wherein the thin film element further includes:
a fourth waveguide having a fourth exit proximate the second side; and
a fifth waveguide having a fifth exit proximate the second side;
wherein the splitter is further configured to split light passing through the first waveguide among at least the fourth waveguide and the fifth waveguide.

7. The portable electronic system of claim 3, wherein the thin film element further includes an optical amplifier at least partially positioned between the first entrance of the first waveguide and the second exit of the second waveguide, the optical amplifier configured to amplify light passing between the first entrance of the first waveguide and the second exit of the second waveguide.

8. The portable electronic system of claim 7, wherein the portable electronic device further includes a power storage element, and wherein the optical amplifier is coupled to and is configured to draw power from the power storage element.

9. A portable electronic system, comprising:
a portable electronic device having a screen; and
a visual extender having a thin film element, the visual extender coupled to the portable electronic device to position the thin film element so as to provide visual extension of the screen to enlarge images generated thereby, the thin film element including:
a screen side facing the screen;
a second side opposite the screen side, a distance between the screen side and the second side defining a thickness of the thin film element;
a first tapered waveguide expanding from a first entrance proximate the screen side towards a first exit proximate the second side of the thin film element; and
a second tapered waveguide expanding from a second entrance proximate the screen side towards a second exit proximate the second side of the thin film element.

10. The portable electronic system of claim 9, wherein the first entrance and the second entrance combined have dimensions that are smaller than or equal to dimensions of a pixel of the screen of the portable electronic device.

11. The portable electronic system of claim 10, wherein the first exit and the second exit each have substantially similar dimensions to the pixel of the screen of the portable electronic device.

12. The portable electronic system of claim 9, wherein the thin film element further includes an optical amplifier at least partially positioned between the first entrance and the first exit of the first tapered waveguide, the optical amplifier configured to amplify light passing through the first tapered waveguide.

13. The portable electronic system of claim 12, wherein the portable electronic device further includes a power storage element, and wherein the optical amplifier is coupled to and is configured to draw power from the power storage element.

14. The portable electronic system of claim 1, wherein the visual extender further includes at least one clip configured to removably couple the visual extender to the portable electronic device.

15. The portable electronic system of claim 1, further comprising a case coupled to the portable electronic device, wherein the visual extender is coupled to the case.

16. The portable electronic system of claim 1, wherein the visual extender is flexible.

17. The portable electronic system of claim 16, wherein the visual extender is configured to be stored within a body of the portable electronic device.

18. An apparatus for visually extending a screen of a portable electronic device to enlarge images generated thereby, the apparatus comprising:
a planar thin film element having a screen side and a second side opposite the screen side, a distance between the screen side and the second side defining a thickness of the planar thin film, and the planar thin film element including
a first waveguide having a first entrance proximate the screen side and a first exit positioned between the screen side and the second side,
a second waveguide having a second entrance proximate the first exit of the first waveguide and a second exit proximate the second side of the planar thin film, a cross-section of the second waveguide expanding from the second entrance towards the second exit,
a third waveguide having a third entrance proximate the first exit of the first waveguide and a third exit proximate the second side of the planar thin film, a cross-section of the third waveguide expanding from the third entrance towards the third exit, and
a splitter located between the first waveguide and the second and third waveguides which is configured to split light emanating from the screen of the portable electronic device and passing through the first waveguide among at least the second waveguide and the third waveguide; and
a coupling element configured to couple the apparatus to a portable electronic device with the screen side of the planar thin film element facing and overlying a screen of the portable electronic device.

19. The apparatus of claim 18, wherein the second exit and the third exit each have substantially similar dimensions to the first entrance.

20. The apparatus of claim 18, wherein the thin film element further includes:
a fourth waveguide having a fourth exit proximate the second side; and
a fifth waveguide having a fifth exit proximate the second side;
wherein the splitter is further configured to split light passing through the first waveguide among at least the fourth waveguide and the fifth waveguide.

21. The apparatus of claim 18, wherein the thin film element further includes an optical amplifier at least partially positioned between the first entrance of the first waveguide and the second exit of the second waveguide, the optical amplifier configured to amplify light passing between the first entrance of the first waveguide and the second exit of the second waveguide.

22. The apparatus of claim 21, wherein the optical amplifier is configured to couple to and draw power from a power storage element associated with the portable electronic device.

23. An apparatus for visually extending a screen of a portable electronic device to enlarge images generated thereby, the apparatus comprising:
a planar thin film element having a screen side and a second side opposite the screen side, a distance between the screen side and the second side defining a thickness of the planar thin film element, and the planar thin film element including a first tapered waveguide expanding from a first entrance proximate the screen side towards a first exit proximate the second side of the planar thin film element and a second tapered waveguide expanding from a second entrance proximate the screen side towards a second exit proximate the second side of the planar thin film element; and
a coupling element configured to couple the apparatus to a portable electronic device with the screen side of the planar thin film element facing and overlying a screen of the portable electronic device.

24. The apparatus of claim 23, wherein the thin film element further includes an optical amplifier positioned between the first entrance and the first exit of the first tapered waveguide, the optical amplifier configured to amplify light passing through the first tapered waveguide.

25. The apparatus of claim 24, wherein the optical amplifier is configured to couple to and draw power from a power storage element associated with the portable electronic device.

26. The apparatus of claim 18, wherein the coupling element comprises at least one clip configured to removably couple the apparatus to the portable electronic device.

27. The apparatus of claim 18, wherein the coupling element is configured to couple the apparatus to a case for the portable electronic device.

28. A method of visually extending a screen of a portable electronic device to enlarge images generated thereby, the method comprising:
displaying an image on a screen of a portable electronic device;
coupling a visual extender having a planar thin film element to the portable electronic device, the planar thin film element having a screen side and a second side opposite the screen side, a distance between the screen side and the second side defining a thickness of the planar thin film element, and the planar thin film element including
a first waveguide having a first entrance proximate the screen side and a first exit positioned between the screen side and the second side,
a second waveguide having a second entrance proximate the first exit of the first waveguide and a second exit proximate the second side of the planar thin film element, a cross-section of the second waveguide expanding from the second entrance towards the second exit,
a third waveguide having a third entrance proximate the first exit of the first waveguide and a third exit proximate the second side of the planar thin film element, a cross-section of the third waveguide expanding from the third entrance towards the third exit, and
a splitter located between the first waveguide and the second and third waveguides which is configured to split light emanating from the screen of the portable electronic device and passing through the first waveguide among at least the second waveguide and the third waveguide;
positioning the visual extender with the screen side of the thin film element facing and overlying the screen of the portable electronic device; and
displaying at least a portion of the image as a visually enlarged portion on the second side of the planar thin film element.

29. The method of claim 28, wherein positioning the visual extender includes positioning the visual extender to overlay locations of the portable electronic device other than a user interface of the portable electronic device.

30. The method of claim 28, wherein coupling the visual extender to the portable electronic device includes clipping the visual extender to the portable electronic device.

31. The method of claim 28, wherein coupling the visual extender to the portable electronic device includes coupling the visual extender to a power storage element of the portable electronic device.

32. The method of claim 28, wherein coupling the visual extender to the portable electronic device includes coupling a case carrying the visual extender to the portable electronic device.

33. The method of claim 28, further comprising amplifying light emitted from the first waveguide of the visual extender.

34. The method of claim 33, further comprising splitting light between the second and the third waveguides of the visual extender, and wherein the amplification of the light emitted from the first waveguide occurs prior to the light being split between the second and the third waveguides.

35. The method of claim 34, further comprising adaptively modifying light emitted from the second waveguide prior to the light exiting the thin film element.

36. The portable electronic system of claim 3, wherein the splitter is configured to split only light from a single pixel of the screen.

37. The portable electronic system of claim 3, wherein the thin film element includes additional splitters, each additional splitter receives light from a respective pixel of the screen.

* * * * *